March 16, 1926.
L. HOTTO
AUTOMOBILE SPRING
Filed April 1, 1925
1,577,233
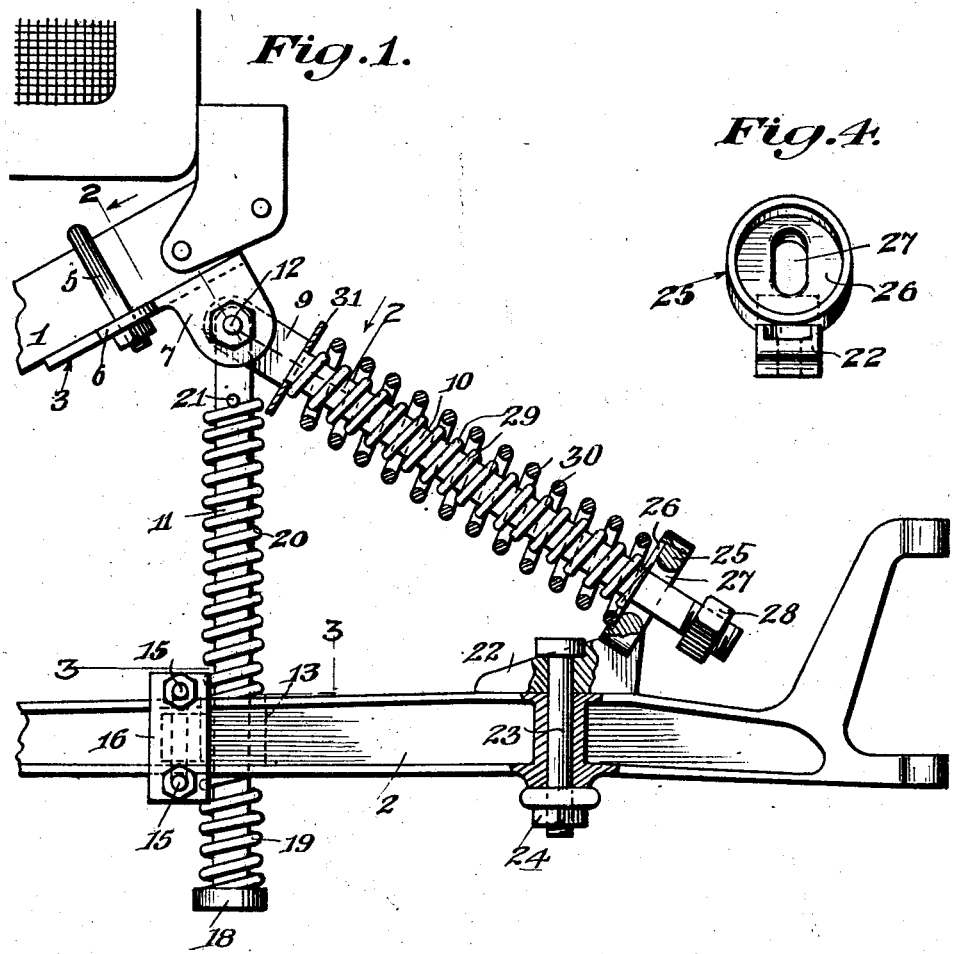
INVENTOR.
Louis Hotto,
BY
Geo. P. Kimmel
ATTORNEY.

Patented Mar. 16, 1926.

1,577,233

UNITED STATES PATENT OFFICE.

LOUIS HOTTO, OF EAST CARONDELET, ILLINOIS.

AUTOMOBILE SPRING.

Application filed April 1, 1925. Serial No. 19,957.

*To all whom it may concern:*

Be it known that I, LOUIS HOTTO, a citizen of the United States, residing at East Carondelet, in the county of St. Clair and State of Illinois, have invented certain new and useful Improvements in Automobile Springs, of which the following is a specification.

This invention relates to vehicle springs and pertains particularly to the class of automobile springs.

The primary object of this invention is the provision, in the manner as hereinafter set forth, of a spring structure for automobiles, replacing the present leaf springs and supporting the chassis frame upon the axles at each corner thereof, in such a manner that vertical support is given to the chassis frame and in addition side support to resist side sway of the frame and body on the axles.

The invention contemplates the provision of a bracket member adapted to be secured to the chassis frame, one at each corner thereof. Pivotally secured at one end to this bracket member is a pair of arms, one extending downwardly therefrom and through a supporting clip carried by the axles therebeneath and having surrounding it a pair of helical springs, one above and the other below said clip and bearing thereagainst to resiliently support the arm. The adjacent other arm extends downwardly and outwardly from the bracket and has its forward end extending through a supporting bracket carried upon the top of the axle and is surrounded by a helical spring structure, one end of which abuts a surrounding plate adjacent the upper end of the arm and the other end abutting the supporting bracket adjacent the lower end of the arm. The two arms are shiftable through their supporting brackets and movement therethrough is resisted by the surrounding spring. Direct vertical support is given to the chassis frame and vehicle body by the vertical arms and surrounding springs, and the obliquely directed spring controlled arms act to maintain the body in the upright position, and also prevent the body from swaying excessively when the vehicle is in motion, particularly when rounding a curve.

A final object of the invention is the provision, in the manner as hereinafter set forth, of a vehicle spring structure of the above described type, which will be easily and quickly installed, strong and durable, neat in appearance and efficient for the purpose set forth.

The invention will be best understood from a consideration of the following detailed description taken in connection with the accompanying drawing forming a part of this specification, with the understanding however, that the invention is not confined to any strict conformity with the showing of the drawing, but may be changed and modified so long as such changes and modifications mark no material departure from the salient features of the invention as expressed in the appended claim.

In the drawing.

Figure 1 is a view showing the device embodying this invention in elevation, parts thereof being broken away, and as applied to a vehicle.

Figure 2 is a section taken upon the line 2—2 of Figure 1.

Figure 3 is a section taken upon the line 3—3 of Figure 1.

Figure 4 is a detail of a portion of the structure.

Referring now to the drawing in detail wherein like numerals of reference indicate corresponding parts throughout the several views, the numeral 1 indicates a portion of the front cross member, and 2 a portion of the front axle of an automobile of well known construction. The usual transverse leaf spring and supporting perch is removed for the installation of the device embodying this invention.

The invention contemplates the provision of a bracket member indicated generally by the numeral 3, this bracket comprising a body portion 4 which is adapted to fit in the channel of the cross member 1 of the vehicle, and is secured thereinto by means of the U-bolt 5, the ends of which extend through ears 6 extending laterally from the lower face of the body 4 beyond the sides of the cross member 1, as shown in Figure 2. The body 1 has formed at one end a pair of depending spaced bracket ears 7, each of which is provided with a central aperture 8.

Positioned between the bracket ears 7 is the bifurcated end 9 of an arm member 10, and between the furcations of the end 9 there is positioned one end of a second arm 11. Passing through the apertures 8 and the ends of the arms 10 and 11 positioned between the ears 7 is a securing pivot bolt 12 upon which the arms are adapted to swing.

The arm 11 extends directly downwardly through a supporting guide collar 13 having an extended portion 14 by means of which the collar is secured against the inner face of the axle 2 by means of a surrounding U-bolt 15, the legs of which pass through a yoke 16 lying across the other side of the axle and against this yoke the nuts 17 are drawn on the threaded ends of the legs of the bolt. The lower end of the arm 11 terminates in a head 18 and surrounding the lower end of the arm is a helical spring 19, the lower end of which bears against the head 18 while the upper end bears against the underside of the collar 13. Surrounding the arm above the collar 13 is a second supporting helical spring 20, the lower end of which rests upon the collar 13 while the upper end thereof bears against and is held under tension by means of the pin member 21, which extends through the arm 11 adjacent the pivoted upper end thereof. Upon this pin 21 most of the supporting weight is placed, the pin being supported directly upon the upper end of the spring 20.

Positioned upon the top of the axle 2 at the point normally occupied by the leaf spring perch, is a bracket supporting block 22 through which a bolt 23 passes into and through the axle 2 to secure the block into position thereon. The bolt is retained in position by means of the nut 24. At one end of the block 22 an upwardly and outwardly inclined circular bracket plate 25 is mounted, the inner face of which is recessed as at 26, and the central portion slotted as at 27. Through this slot 27 the free outer end of the arm 10 extends and is prevented from escapement therefrom by means of the nut 28 carried upon the end thereof.

Surrounding the arm 10 is a pair of nested helical springs 29 and 30 respectively, the spring 29 being of small convolution and the spring 30 having larger convolution and of heavier structure. The lower ends of these springs seat in the recessed face 26 of the bracket plate 25 and the upper ends thereof bear against the plate 31 which abuts the shoulders formed by the bifurcated portion of the arm. These springs 29 and 30 resist side swaying movement of the vehicle body acting to hold the body in vertical position at all times, whereas the spring 20 takes the weight of and supports the body.

From the foregoing description it will be readily seen that there has been provided a vehicle spring structure which is both unique and serviceable, acting to improve the riding qualities of any vehicle to which it is applied.

Having thus described my invention what I claim is:

The combination with a pair of clips and perch, one clip and the perch being adapted to be secured to an axle, the other clip being adapted to be secured to the chassis of an automobile above the first named clip, of eye members made fast by the clips, of a pair of arms, a pivot common to both arms and connecting the same to the eye member on the chassis, said arms slidable through the eye member and perch on the axle, coiled springs surrounding the arms between the axle and chassis, and a coiled spring on one of the arms and active counter to the other spring thereon.

In testimony whereof, I affix my signature hereto.

LOUIS HOTTO.